S. R. KENNEDY.
METHOD OF TREATING MILK.
APPLICATION FILED JUNE 1, 1906.
970,719.
Patented Sept. 20, 1910.
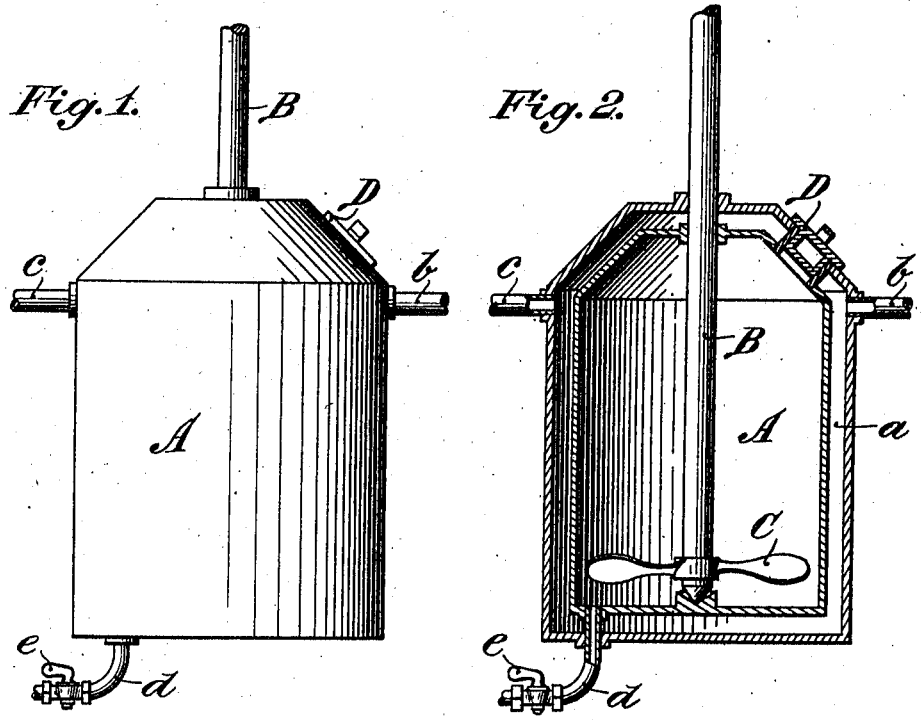
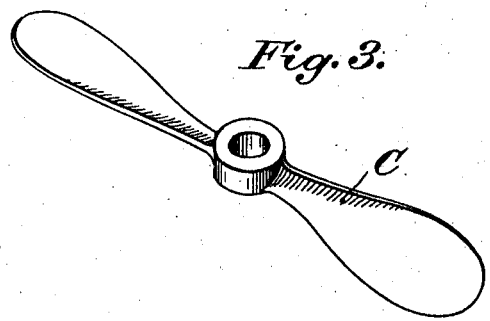
WITNESSES:
Percival N. Reid.
Arno P. Murowitz.
INVENTOR
Samuel Ridgway Kennedy,
BY
John Dolman
ATTORNEY.

UNITED STATES PATENT OFFICE.

SAMUEL RIDGWAY KENNEDY, OF PHILADELPHIA, PENNSYLVANIA.

METHOD OF TREATING MILK.

970,719.  Specification of Letters Patent.  Patented Sept. 20, 1910.

Application filed June 1, 1906. Serial No. 319,672.

*To all whom it may concern:*

Be it known that I, SAMUEL RIDGWAY KENNEDY, a citizen of the United States, residing at Philadelphia, in the county of Philadelphia and State of Pennsylvania, have invented certain new and useful Improvements in the Method of Treating Milk, of which the following is a specification.

My invention relates to the method of treating milk in removing the milk sugar and salts therefrom, and has for its object the facilitating of that process.

The milk is first condensed in an ordinary vacuum pan to about twenty one and a half Baumé, though it may be condensed to a higher degree if desired as explained in my Patent No. 772,517 issued October 18th 1904 for a process of making milk sugar. The condensed milk is then cooled, preferably, by being run over refrigerating tubes, and then allowed to stand until the milk sugar and salts crystallize, as fully described in my patent above cited. The thick and gritty milk is now poured into a beating engine of any approved construction in which it is stirred or beaten to reduce its viscosity or render it more fluid. The beating engine that I have used, and up to the present time found most satisfactory, is illustrated in the drawing, in which—

Figure 1 is an outside view, Fig. 2 a vertical section, and Fig. 3 an enlarged perspective view of the paddle or beater.

It consists of a can A, which is jacketed or has double walls forming a space, a, in which brine or other cooling fluid may be circulated. In the center of the can, A, a shaft, B, is mounted having bearings at top and bottom, as shown; and on the shaft, B, a paddle, C, of propeller shape, is fastened, as shown; an outlet, d, with a cock, e, is provided.

b, and, c, are the inlet and outlet for the refrigerating fluid, and, D, is an opening through which the milk is poured into the can A.

After beating, the crystallized milk sugar and salts are filtered out, preferably by means of a centrifugal as described in my patent above referred to. By thus beating the mass of condensed milk before filtering, I have found that it not only filters quicker and more easily, but more perfectly, that is, there does not appear to be so much fat, albumen or other material adhere to the precipitated milk sugar and salts as when the step of beating is omitted.

I am not able to fully explain the reason for the reduction of viscosity by beating, but there can be no doubt of the fact. Apparently the condensed milk,—especially after standing some time,—takes on an organic or crystalline structure or a structure of some kind, which is broken up by the beating allowing the material to flow much more freely, and loosening the fibers or particles which adhere to the crystals of milk sugar and salts.

The advantage I have found in the particular form of beating engine illustrated in the drawing is that the propeller shape of paddle appears to work more easily than any other shape while being as effective, and by beating only the lower portion of the milk in the can A, it is rendered fluid and passes off through the outlet d, allowing the upper portions to fall and be beaten in turn, when by continuing to supply material at the top, the process is rendered continuous.

Sometimes where milk has been allowed to stand for a great length of time, although the top portion may be poured off the lower parts become very thick, in this case I sometimes add a little water to the thick portion before beating, perhaps half a gallon to one hundred pounds.

Having as above fully described my invention and the best methods known to me of working the same, what I claim and desire to secure by Letters Patent is.

The process of treating milk which consists in first condensing it to a suitable density, cooling it until the milk sugar and salts have crystallized, beating or agitating it until the viscosity is sufficiently reduced, and filtering out the milk sugar and salts.

In testimony whereof I affix my signature in presence of two witnesses.

SAMUEL RIDGWAY KENNEDY.

Witnesses:
 ALBERT EUGENE TAYLOR,
 JOHN MILLER.